Oct. 6, 1959
F. SE BASTIAN
2,907,265
BEVERAGE DISPENSING MACHINE
Filed May 31, 1957
9 Sheets-Sheet 1
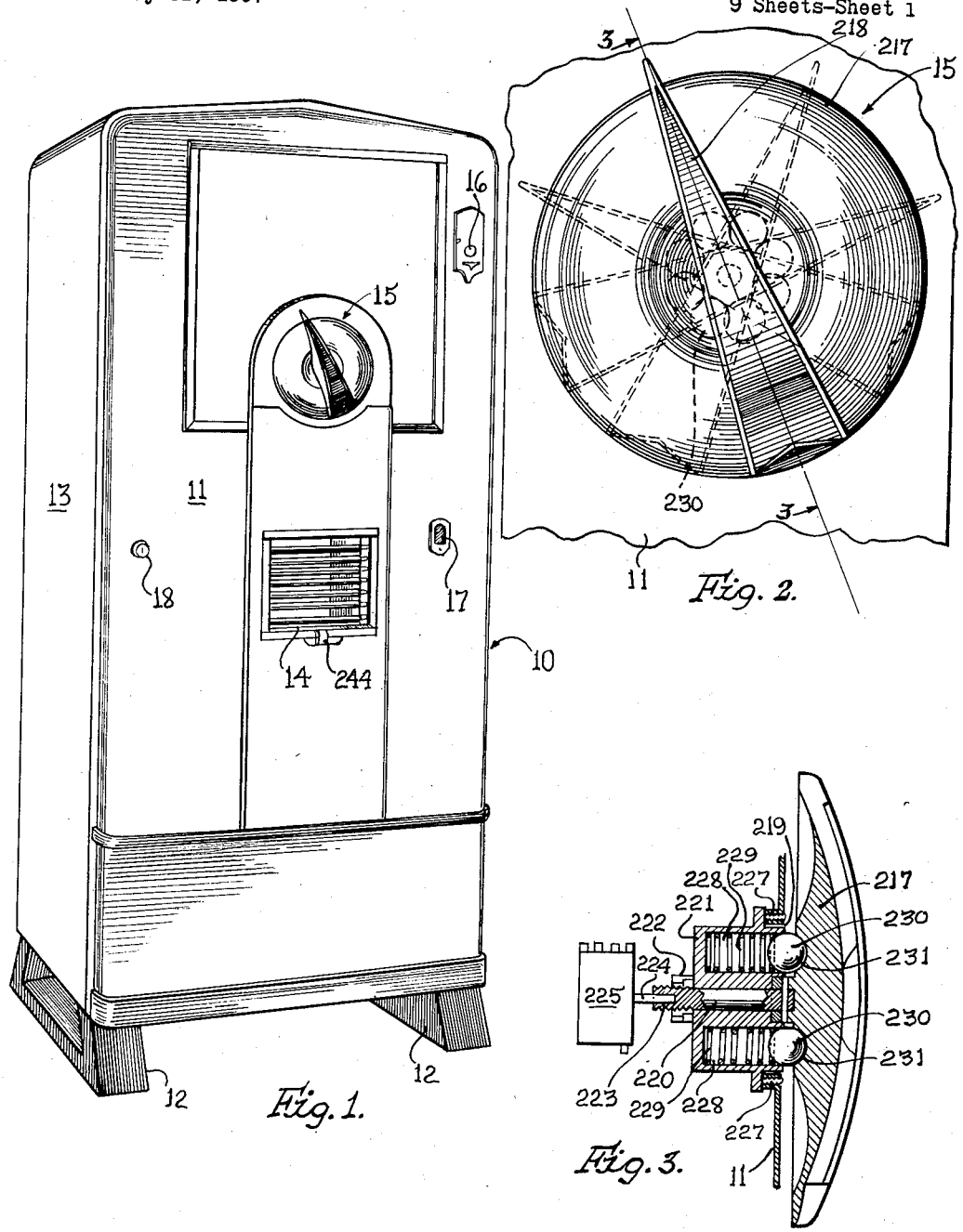
INVENTOR.
FORD SEBASTIAN
BY
*Threedy & Threedy*
HIS ATTORNEYS.

Oct. 6, 1959 F. SE BASTIAN 2,907,265
BEVERAGE DISPENSING MACHINE
Filed May 31, 1957 9 Sheets-Sheet 2

INVENTOR.
FORD SEBASTIAN
BY Phreedy & Phreedy
HIS ATTORNEYS.

Oct. 6, 1959  F. SE BASTIAN  2,907,265
BEVERAGE DISPENSING MACHINE
Filed May 31, 1957  9 Sheets-Sheet 3

INVENTOR.
FORD SEBASTIAN
BY
Thready & Thready
HIS ATTORNEYS.

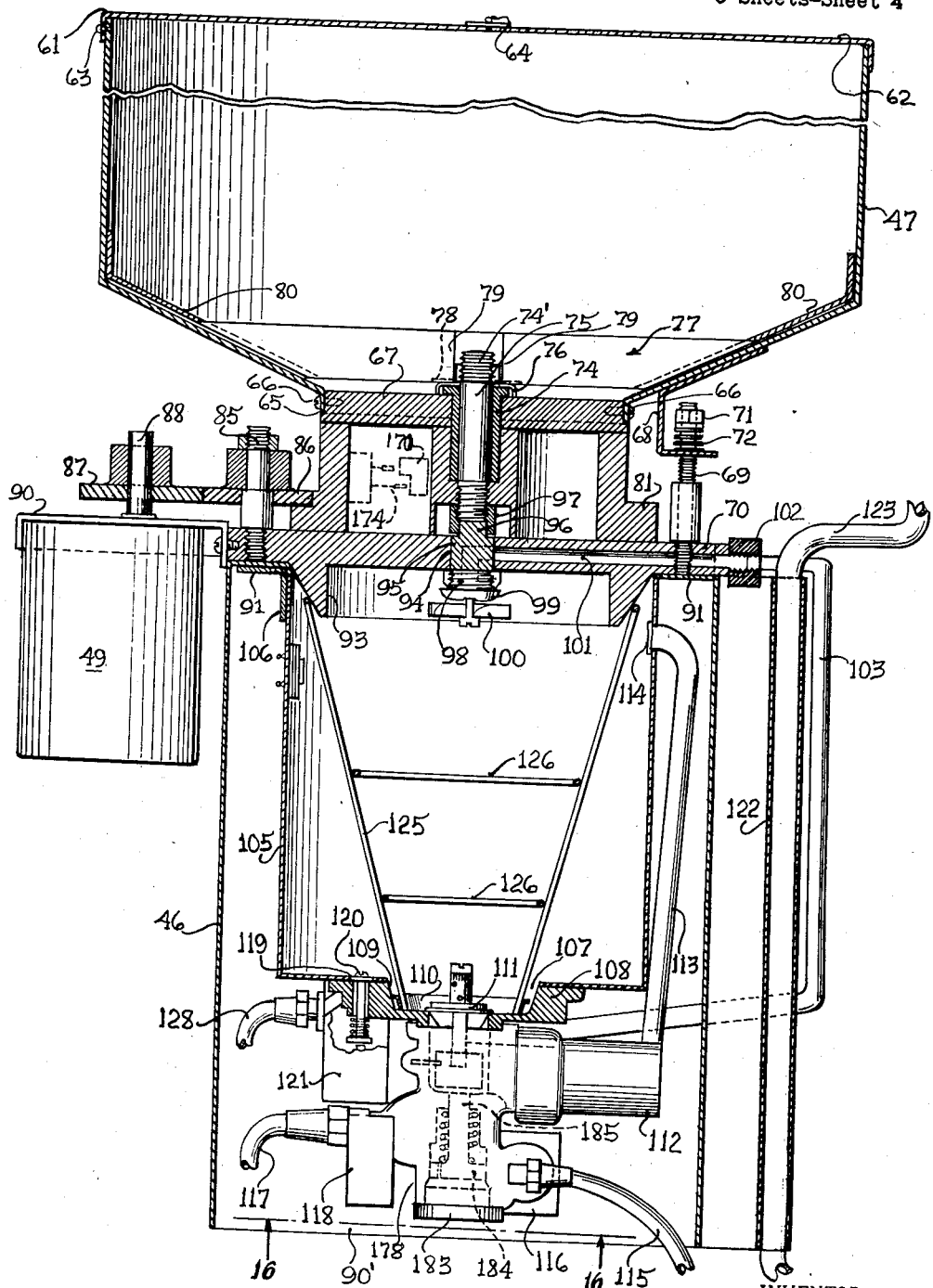

Oct. 6, 1959

F. SE BASTIAN 2,907,265

BEVERAGE DISPENSING MACHINE

Filed May 31, 1957

INVENTOR.
FORD SEBASTIAN
BY
Thredy & Thredy.
HIS ATTORNEYS.

Oct. 6, 1959

F. SE BASTIAN 2,907,265

BEVERAGE DISPENSING MACHINE

Filed May 31, 1957

INVENTOR.

BY Ford SeBastian

Threedy & Threedy

HIS ATTORNEYS.

Oct. 6, 1959 F. SE BASTIAN 2,907,265
BEVERAGE DISPENSING MACHINE
Filed May 31, 1957 9 Sheets-Sheet 7

INVENTOR.
FORD SEBASTIAN
BY Threedy & Threedy
HIS ATTORNEYS.

Oct. 6, 1959　　　　　F. SE BASTIAN　　　　2,907,265
BEVERAGE DISPENSING MACHINE
Filed May 31, 1957　　　　　　　　　　　9 Sheets-Sheet 8

INVENTOR.
FORD SEBASTIAN
BY
Threedy & Threedy
HIS ATTORNEYS.

Oct. 6, 1959

F. SE BASTIAN 2,907,265

BEVERAGE DISPENSING MACHINE

Filed May 31, 1957

INVENTOR.
FORD SEBASTIAN
BY
Shreedy & Shreedy
HIS ATTORNEYS.

United States Patent Office 2,907,265
Patented Oct. 6, 1959

2,907,265

BEVERAGE DISPENSING MACHINE

Ford Se Bastian, Glen Ellyn, Ill., assignor to Silex Company, Chicago, Ill., a corporation of Connecticut Application May 31, 1957, Serial No. 662,823

8 Claims. (Cl. 99—283)

My invention relates to new and useful improvements in a beverage dispensing machine and has for its principal object an improved apparatus for dispensing hot beverages.

An object of my invention is in the provision in a machine of this character of a coffee brewing chamber which is fully automatic and responsive to a predetermined condition of such machine.

Another object of my invention is in the provision in a machine of this character of a brewed coffee reservoir wherein the coffee is maintained in a heated condition.

Still another object of my invention is in the provision in a machine of this character of a means actuated by the level of brewed coffee in the coffee reservoir which automatically commences a brewing cycle for the brewing of additional coffee in the brewing chamber.

Yet another object of my invention is in the provision in a machine of this character of a fully automatic cycling mechanism for coffee brewing followed by a cold water rinse of the brewing chamber.

Still another object of my invention is in the provision in a machine of this character of a method of maintaining a constant water pressure system throughout the machine for successfully operating the brewing of coffee and rinsing of the coffee brewing chamber.

Another object of my invention is found in the provision in a machine of this character of a novel pressurized drainage system.

Still another object of my invention is in the provision in a machine of this character of a refrigerator unit for preserving fresh cream, liquid sugar and chocolate syrups or the like.

Yet another object of my invention is in the provision in a machine of this character of a refrigerated delivery means whereby such refrigerated ingredients are maintained in a refrigerated state until delivered from such machine.

Yet a further object of my invention is in the provision in a machine of this character of a novel cup positioning and holding mechanism associated with the refrigerated delivery means.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of my improved beverage dispensing machine;

Fig. 2 is a fragmentary plan view showing the selector dial associated with my machine, depicting in dotted lines the delivery positions of such selector;

Fig. 3 is a sectional detail view taken on line 3—3 of Fig. 2;

Fig. 7 is a detail sectional view taken on line 7—7 of Fig. 5;

Figure 4:
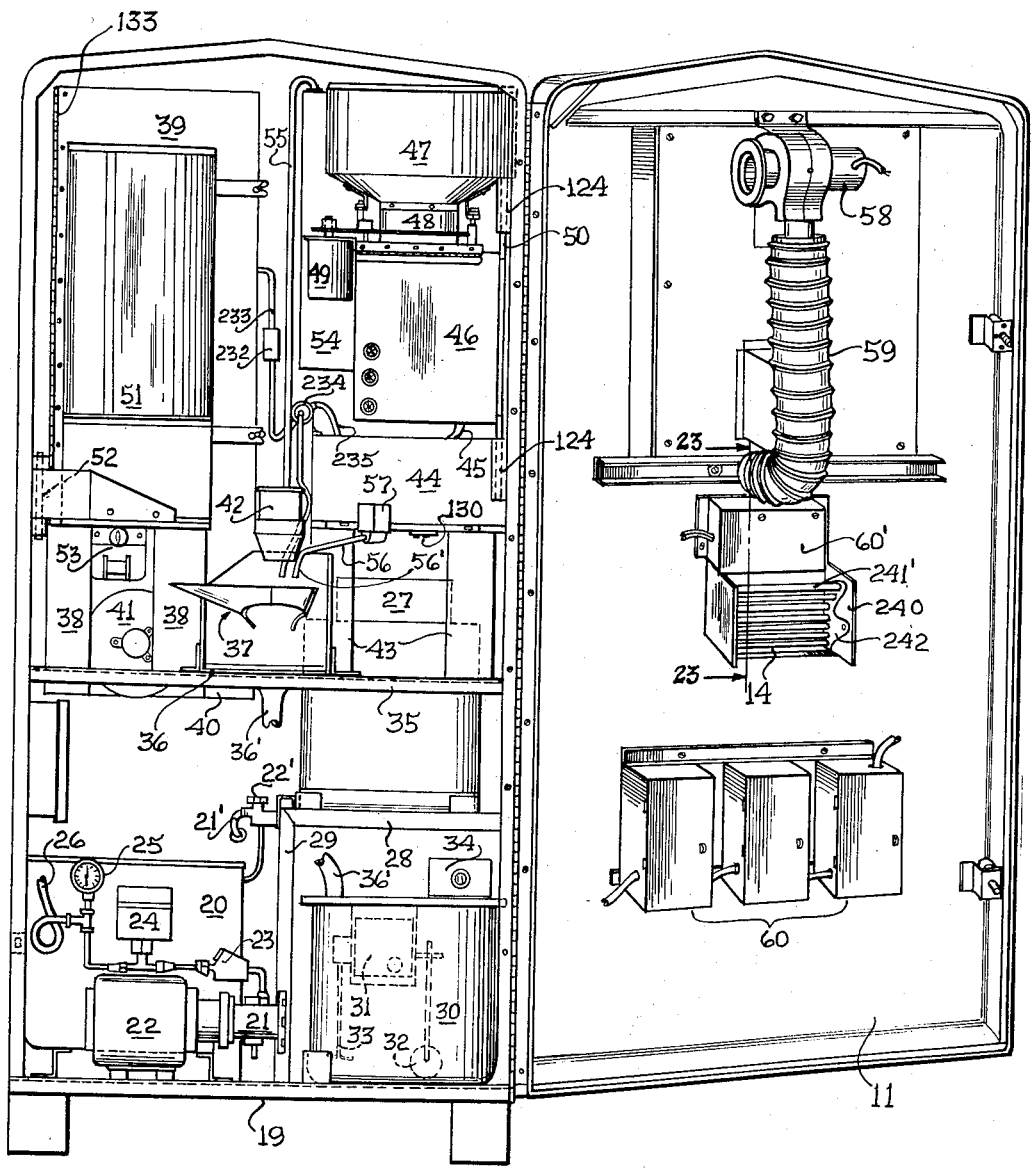
Fig. 4 is a front elevational view of my beverage dispensing machine with the door thereof open.

Referring to Fig. 1, the coffee making apparatus comprises a cabinet 10 having a door 11. The cabinet 10, is supported by suitable legs 12, which legs extend parallel to the side walls 13 of the cabinet. The door 11 is provided with a commodity delivering area 14 and suitable door hereinafter more fully described. A dial-type selector 15 is positioned on the door panel 11 and controls the selection of the commodity to be delivered to the delivery area 14. As it is desired that this coffee machine apparatus be coin-controlled, a suitable coin entrance 16 and coin return 17 are shown at their preferred positions on the outside of the door 11. A suitable door lock 18 is provided to seal the machine.

Fig. 4 disclosed the internal structure of the machine and each unit's functional relationship with respect to each other. For the purpose of identification, each unit will be given a general number. A complete description of each numbered unit will be given hereinafter.

On the bottom 19 of the cabinet as shown in Fig. 4 and mounted adjacent the rear wall, is a water reservoir 20. Water is supplied from any outside source to the water reservoir 20 through a supply line 21'. A cut-off valve 22' is provided in the line 21' and controls the supply of water to the machine. Immediately forward of the reservoir 20 is a water pump 21. This pump 21 has operative connection to an electric motor 22. Situated in the supply line 21' between the reservoir 20 and the pump 21, is a pressure check valve 23, and a water pressure-responsive control unit 24, together with a suitable pressure gauge 25. From the gauge 25, the water is carried through supply lines 26 to a water heating unit and reservoir 27. The water heating unit 27 is positioned upon a shelf 28 which has one side connected to one side wall of the cabinet 10 and the opposite end thereof supported by legs 29.

A sump tank 30 is positioned on the bottom 19 of the cabinet beneath the shelf 28. This tank 30 has a sump pump 31 controlled by a float-type actuator 32. The tank 30 is also provided with a sump agitator 33. The tank 30 is connected by suitable conduits (not shown) to a drainage system of any type or construction. An electric service outlet 34 is provided on the top of the tank 30 for the convenience of the service man.

A second shelf 35 is provided about midway through the length of the cabinet 10. This shelf 35 supports a cup-support drain plate 36 and a cup holding apparatus 37 (see Fig. 22). From the plate 36 there extends a drain conduit 36' which has open communication with the sump tank 30.

From the left-hand side of the shelf 35, as viewed in Fig. 4, there extend supporting legs 38 which in turn support a partial shelf upon which sits a refrigerator unit 39. Below the refrigerator unit 39 and supported by a bracket 40, is a refrigerator compressor 41 (see Fig. 18).

Extending from one side of the refrigerator unit 39 is a refrigerated snorkel-type delivery unit 42. The free end of the unit 42 is positioned directly above and in spaced relation to the cup holding unit 37.

Figures 5, 6, 17, 24:
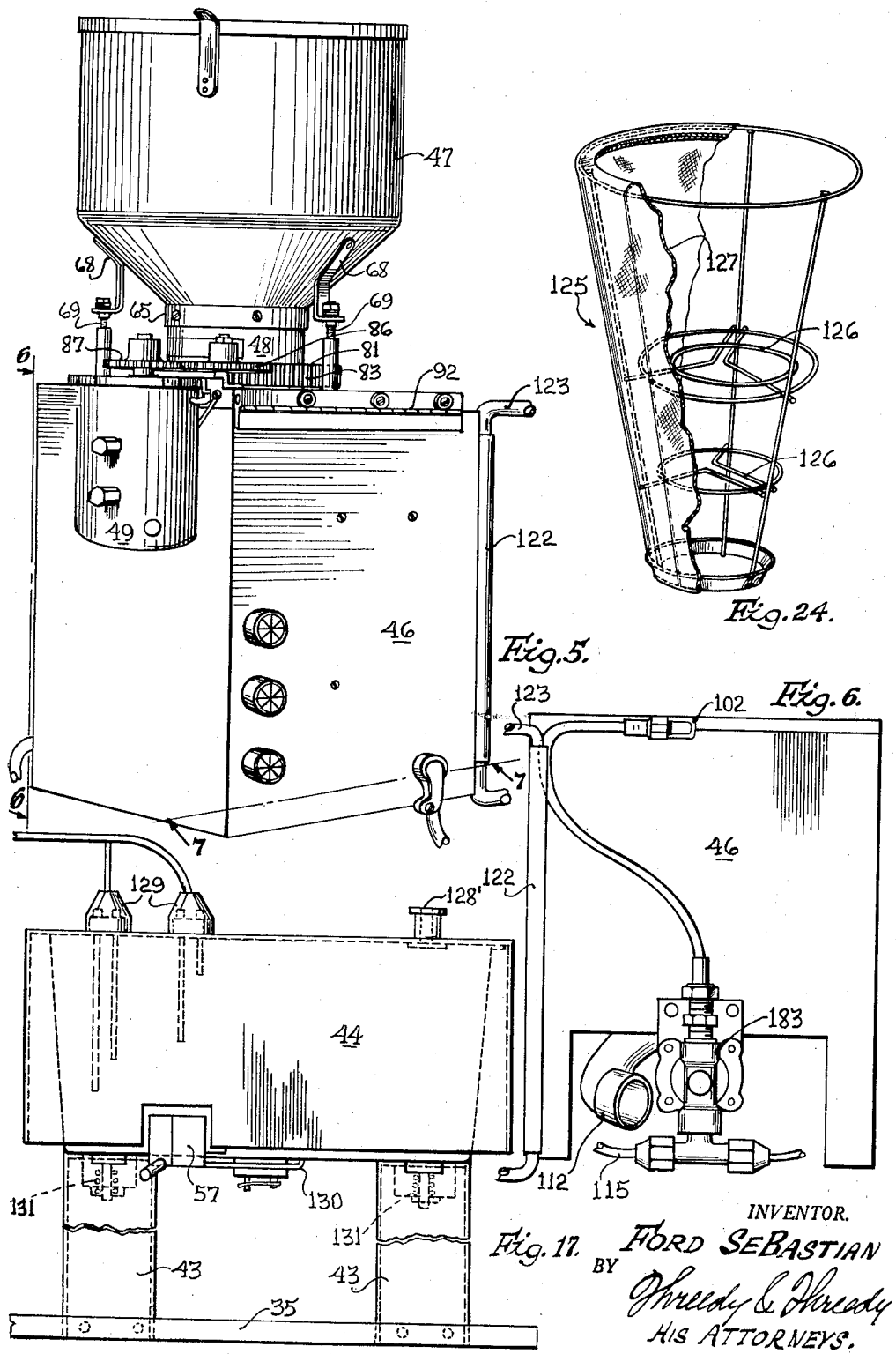
Fig. 5 is a perspective view of my coffee brewing device as associated with my beverage dispensing machine.
Fig. 6 is a fragmentary rear elevational view of the coffee brewing device seen in Fig. 5 taken on line 6—6.
Fig. 17 is a fragmentary side elevational view of the coffee reservoir as employed in my coffee beverage machine.
Fig. 24 is a perspective view of the coffee brewing basket as employed in my machine showing the covering thereof broken away.

Supported by legs 43 extending upwardly from the shelf 35 and immediately above the water heating unit and reservoir 27, is a coffee reservoir 44 (see Fig. 17). This reservoir 44 has a conduit 45 having open communication with a coffee brewing device 46. This coffee brewing device 46 comprises a coffee hopper 47 and a coffee dispensing metering unit 48. This dispensing unit 48 is adapted to be driven by an electric motor 49 carried by the coffee brewing device 46. The coffee brewing device 46 is pivotally connected to the cabinet 10 by a bracket hinge 50.

A cup dispensing unit 51 of any standard construction is pivotally hinged as at 52 to the opposite side of the cabinet 10 forwardly of the refrigerator unit 39. This unit 51 has its own electric motor 53 which controls its operation and which may be operatively connected to certain electric components of the vending machine. The cup dispensing unit 51 is schematically shown in Fig. 4 and is not shown or described in detail in this application as it constitutes no part of the present invention.

A control panel 54 is positioned on the rear wall of the cabinet behind the brewing device 46, the conduit 55 providing electrical connection to any suitable electric supply (not shown).

From the coffee reservoir 44, the brewed coffee is dispensed through a conduit 56. This conduit 56 also contains an electrically operated dispensing valve 57 which controls the flow of coffee through the conduit 56. The conduit 56 terminates into a delivery spout 56' above and in spaced relation to the cup supporting plate 36 and cup holding device 37.

Figure 23:
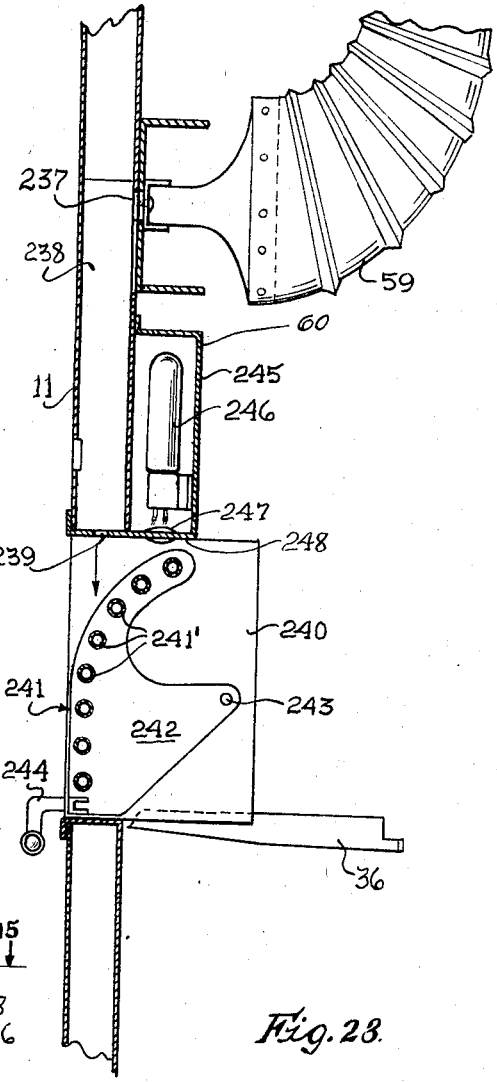
Fig. 23 is a fragmentary detail sectional view taken on line 23—23 of Fig. 4.

On the inner side of the door panel 11, adjacent the top thereof, is mounted a blower 58. This blower 58 has a flexible conduit 59 which terminates into a slot entrance of an air channel formed in the door panel 11 (Fig. 23).

The door panel 11 also provides a mounting for suitable electrical control boxes 60. Above the commodity delivery area 14, is a germicide lamp housing 60'.

Referring to Fig. 7, which is a detail sectional view of the coffee brewing device 46 and its associated parts, there is shown a coffee hopper 47. This hopper 47 is of circular formation and is provided with a top made up of sections 61 and 62. Section 61 is fixedly connected to the side wall of the hopper 47 by means of screws 63. The section 62 is hinged as at 64 to the stationary section 61, thus providing a hinged cover which permits free access to the interior of the hopper 47. The bottom of the hopper 47 terminates into a circular neck 65, which, by screws 66, is fixedly connected to stationary metering disc 67. The hopper 47 also provides brackets 68 which are connected to supporting studs 69 carried by a top metering plate 70. These studs 69 are threaded into the plate 70 and have their free ends threaded to receive a sleeve nut 71. The sleeve portion of the nut 71 extends through the bracket 68 and prevents horizontal shifting of the hopper 47 with respect to the brewing device 46. A coil spring 72 is positioned on the sleeve portion of the nut 71 between the head thereof and the bracket 68. This spring 72 provides a yieldable connection between the hopper 47 and the plate 70 for reasons hereinafter made apparent.

Figure 8:
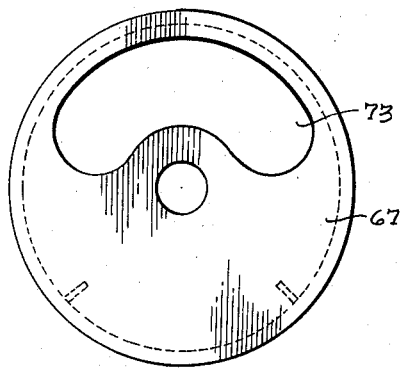
Fig. 8 is a top plan view of the stationary metering disc as employed in the coffee brewing device of my machine.
Figure 9:
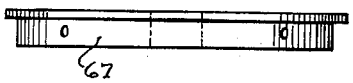
Fig. 9 is a side elevational view of the same.

The stationary metering disc 67 is shown in Figs. 8 and 9 and as viewed therein, has formed therethrough an arcuate opening 73 through which powdered coffee is adapted to pass in measured amounts to the brewing device 46.

The disc 67 has a center opening through which is journalled a bushing 74. One end 74' of an actuating shaft 75 is journalled through the bushing 74.

On this free end 74' of the shaft 75 is pressed a cup washer 76, the edge of which overrides the bushing 74. An agitator 77 consisting of two oppositely disposed vertical fins 79 has a horizontal base portion 78 which is in turn journalled upon the free end 74' of the shaft 75 and which is rotatable therewith. The fins of the agitator 77 are provided with wire arms 80 formed to correspond to the inner configuration of the hopper 47. The arms 80 of the fins of the agitator 77 maintain in a loose granulated condition, the powdered coffee stored in the hopper 47.

Figure 10:
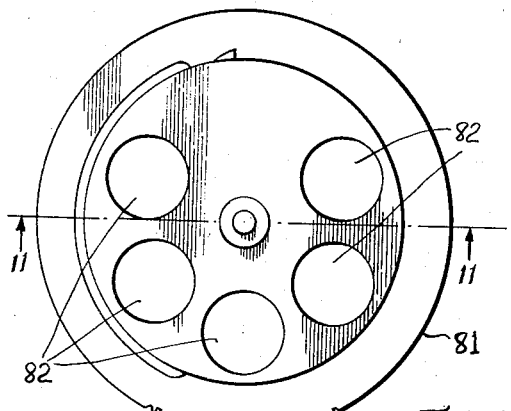
Fig. 10 is a top plan view of the rotatable metering disc as employed in my coffee brewing device.
Figure 11:
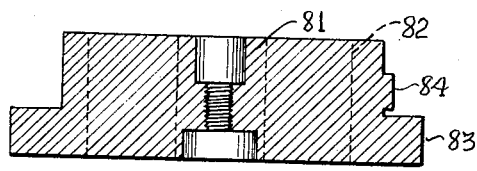
Fig. 11 is a detail sectional view taken on line 11—11 of Fig. 10.

Between the disc 67 and the metering plate 70 of the brewing device 46 and fixedly threaded on the shaft 75, is a rotatable metering disc 81. This disc 81 is shown in Figs. 10 and 11, and as viewed therein, is provided with a series of openings 82. The lower portion of the side wall of the disc 81 provides a gear edge 83. The side wall portion above the gear edge 83 provides a cam track 84, the purpose and function of which will be hereinafter explained.

Figure 14:
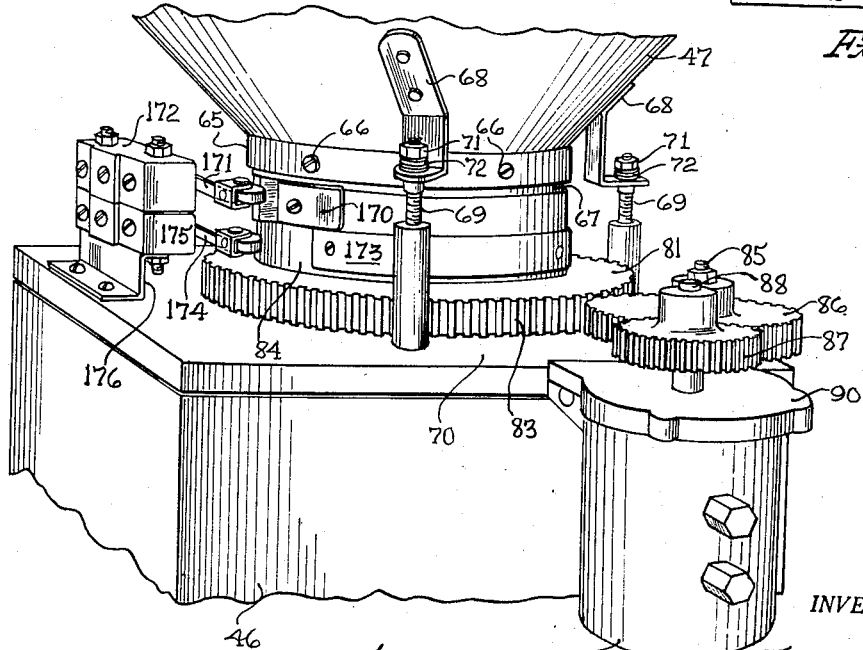
Fig. 14 is a fragmentary perspective view of the parts constituting the operative connection between the coffee hopper and the brewing device of my machine.

Adjacent one side of the disc 81 and carried by a fixed stud 85 threaded into the plate 70 is a gear 86. This gear 86 is adapted to mesh with the gear edge 83 of the disc 81. The gear 86 in turn meshes with and is driven by a gear 87 carried by, and rotatable with, a driven shaft 88 of an electric motor 49. This motor 49 is supportedly carried by a bracket 90 of the top plate 70 (Figs. 7 and 14).

The brewing device 46 consists of a shell structure having an open bottom 90'. The top of the shell provides an inwardly extending flange 91 terminating into a circular top opening. The metering plate 70 has one edge portion hinged as at 92 to the shell of the brewing device 46 (Fig. 5).

The metering plate 70 has a circular depending flange 93 formed on the bottom thereof. This flange 93 is of the same circular shape and size as the opening formed in the top of the shell of the brewing device 46 so as to frictionally fit therein when the plate 70 is positioned on the shell as viewed in Fig. 7. This metering plate 70 has formed therein a central opening 94. Into this opening 94 is pressed fitted, a bushing 95. A reduced end 96, of this bushing 95, is inserted in one end of a bushing 97. The bushing 97 is threaded on the bottom end of the shaft 75. Inwardly of the flange 93 and mounted on the opposite threaded end 98 of the bushing 95, is operatively mounted a spray head 99, together with a spray wheel 100. This spray head 99 has open communication with a water passage 101 formed in the metering plate 70 and bushing 95. On one side of the plate 70, there is provided a threaded socket 102 for receiving one end of a flexible water conduit 103.

Figure 12:
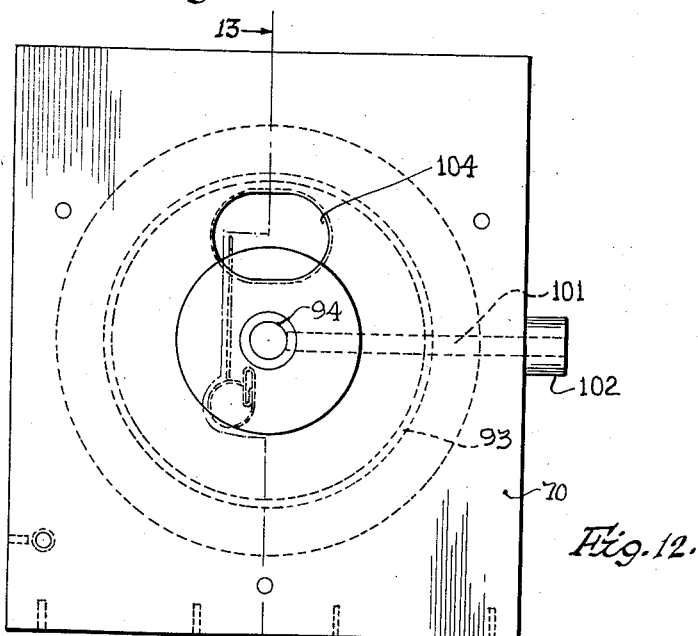
Fig. 12 is a top plan view of the top metering plate as associated with my coffee brewing device.
Figure 13:
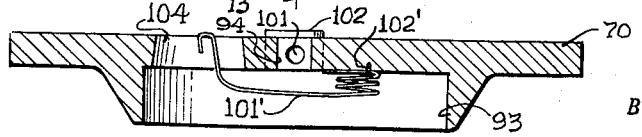
Fig. 13 is a detail sectional view taken on line 13—13 of Fig. 12.

The metering plate 70 is provided with an opening 104 as is shown in Figs. 12 and 13. This opening is normally out of communication with any of the openings 82 formed in the rotatable metering disc 81. Adapted to be inserted through this opening 104 is a spring kicker 101'. This spring 101' is attached to the underside of the plate 70 by means of a screw 102'. When the opening 104 is in registration with any of the openings 82 of the disc 81, the spring kicker will dislodge the coffee in such opening by being spring biased into such opening. The opening being normally out of registration as aforesaid, no coffee will pass into the brewing chamber until the motor 49 is energized and rotates the disc 81 through the chain of gears 83, 86 and 87. The metering disc 81 is of such a thickness that each opening 82 thereof will carry a predetermined amount of powdered coffee.

In its operation, the motor 49 through its gear connection with the disc 81, will rotate the disc 81 between the stationary disc 67 and the metering plate 70. Certain openings 83 of the disc 81 will be rotated into open communication with the opening 73 of the disc 67. Coffee stored in the hopper 47 will then pass through this opening 73 into the openings 83 of the disc 81. The shaft 75 which has threaded connection to the disc 81, will also be rotated therewith and will operate the agitator 77 to insure the powdered coffee of passing into and through the openings as hereinabove explained. The disc 81, by continuing its rotation, will cause the openings 83 thereof to pass into communication with the opening 104 of the plate 70, which will permit the measured amount of coffee in the openings 83 of the disc 81, to pass into a brewing chamber hereinafter described.

Figure 15:
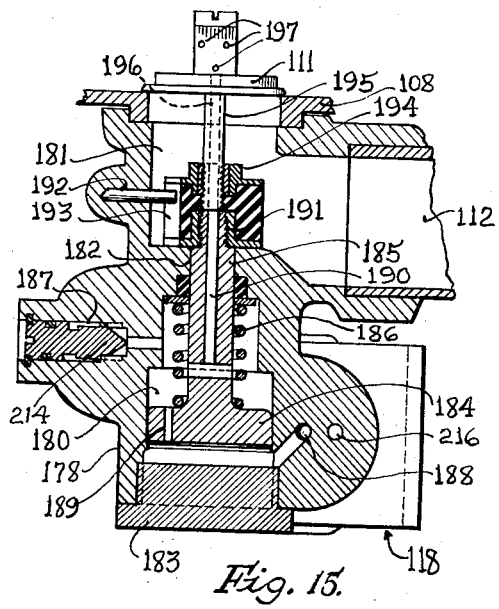
Fig. 15 is a detail fragmentary sectional view taken on line 15—15 of Fig. 16.

The circular brewing chamber 105 is positionable in the shell of the brewing device 46. Such chamber 105 consists of a sealed unit carried by the shell of the brewing device 46. The flange 93 of the plate 70 which forms the top of the shell of the brewing device 46, is insertable into the top of the brewing chamber 105 (Fig. 7). The chamber 105 is mounted to the top flange 91 of the shell 46 by means of L-brackets 106. In the bottom of the chamber 105 is formed an opening 107. This opening 107 is closed by a plate 108 welded thereto. This plate 108 provides a well 109 in which is formed a drain port 110 closed by a valve head 111. This valve head 111 is shown in Fig. 15, and will be hereinafter described.

The drain port 110 has communication with a suitable drain pipe 112. The drain pipe 112 has communication with an over-flow pipe 113 which is in communication with the top of the brewing chamber as at 114. The drain pipe 112 may be connected in any suitable manner to the sump tank 30, hereinbefore described.

Figure 16:
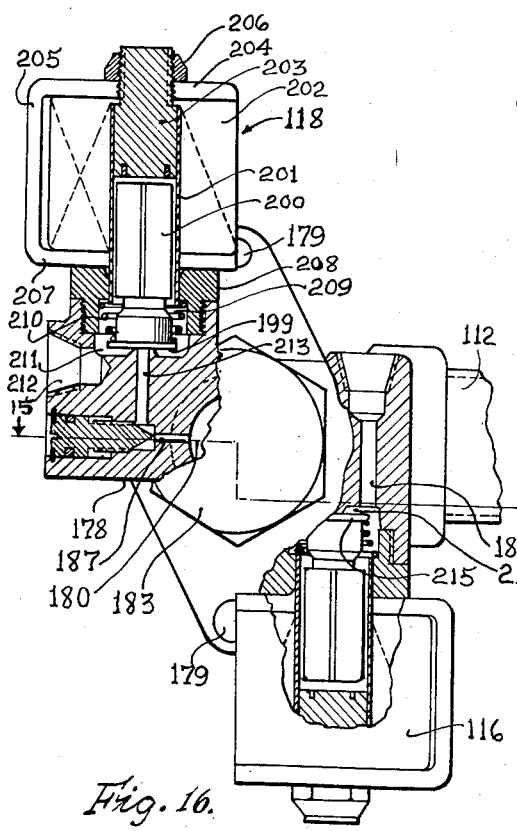
Fig. 16 is a fragmentary sectional bottom view taken on line 16—16 of Fig. 7.

A cold water lead 115 is connected to a solenoid-operated valve 116. This valve is shown in Fig. 16 and will be hereinafter described. A hot water lead 117 has a like operative connection to a solenoid-operated valve 118. Both the cold water lead 115 and the hot water lead 117, through their respective solenoids will permit water to be admitted into the chamber 105 at predetermined periods.

In the bottom of the brewing chamber 105 adjacent one side of the opening 107, is a second opening 119. This opening 119 is closed by a decant valve 120 which is also actuated by a solenoid 121.

A channel 122 is formed on one side of the brewing device shell 46 as seen in Figs. 4 and 7. This channel 122 houses a hinged rod 123 which has its ends fitted into the hinge plates 124 formed on the side of the cabinet, as viewed in Fig. 4.

In the brewing chamber 105, there is positioned a removable brewing basket 125. This basket 125 has one end positioned in the well 109 and surrounds the drain valve head 111. The opposite end of the basket 125 frictionally fits on the outside of the flange 93 of the metering plate 70.

Referring to Fig. 24, the basket 125 is shown to be formed of wire and includes breakers 126 which are adapted to intercept, retain, and dispense the powdered coffee as it is dispensed into the basket 125 seated in the brewing chamber 105 in the manner hereinbefore described. The basket 125 is provided with a cloth type covering 127, within which the coffee grounds are retained while the coffee is brewing and until flushed out of the brewing chamber in a manner hereinafter described.

Brewed coffee will pass through the conduit 45 from the coffee brewing chamber 105 into the coffee reservoir 44, through the valve opening 119 when the valve head 120 is actuated by its solenoid 121. The brewing of coffee in the coffee chamber 105 is controlled by the level of brewed coffee in the reservoir 44. The reservoir 44 employs electrical liquid level probes 129 (Fig. 17). A solenoid-operated decant valve 57 controls the passing of brewed coffee from the reservoir 44 to the conduit 56 for delivery to the customer.

The reservoir 44 is seated upon springs 131 which may be conveniently used as a levelling means when the reservoir 44 is installed in the coffee brewing machine. The reservoir 44 is provided with a suitable intake port 128' (Fig. 17) having communication with the conduit 128, Fig. 7.

Figure 18:
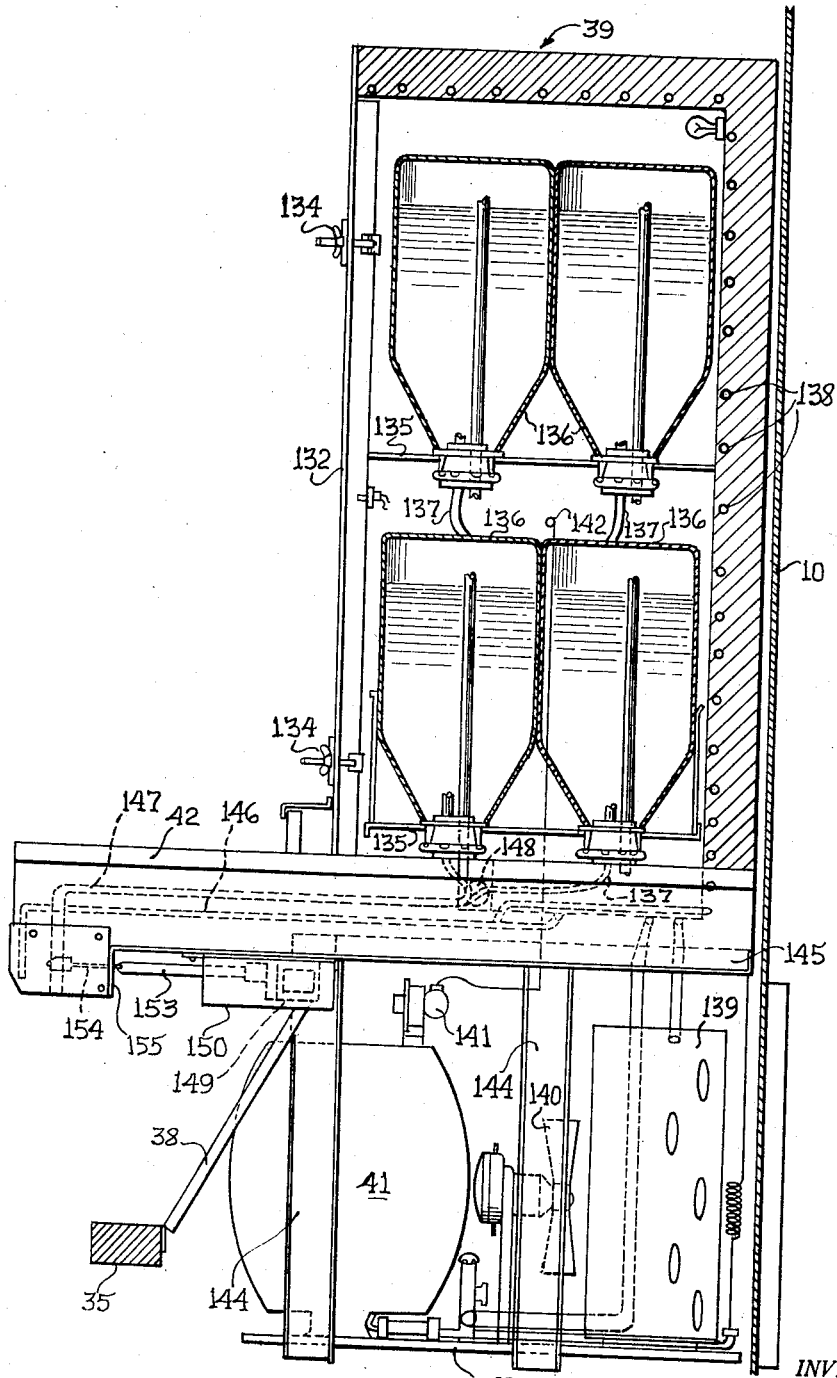
Fig. 18 is a vertical sectional view of the refrigerator unit as associated with my beverage dispensing machine.

My coffee vending machine is adapted to deliver fresh cream to the customer when it is so desired. In order to prevent the cream becoming sour, I have included within my apparatus a refrigerator unit 39. Referring to Fig. 18, I have shown a cross sectional view of my refrigerator unit 39. A door 132 is hinged at 133 (Fig. 4). This door is provided with wing nut locks 134. A shelf 135 divides the refrigerator unit 39 into two compartments. These compartments store, in an inverted position, bottles 136, which contain ingredients such as cream, liquid sugar solution, and chocolate. The bottles are provided with covers having a siphon arrangement, which in turn are connected to conduits 137.

The refrigerator unit 39 is constructed of insulated material through which pass refrigerant coils 138. These coils 138 have communication with the compressor 41 and a cooling screen 139, such as are standard in a refrigerator unit. A suitable fan 140 is placed adjacent the cooling screen 139 as viewed in Fig. 18. A suitable thermostat control 141 is associated with the compressor 41 and with the interior of the refrigerator cabinet. The compressor 41, fan 140, and the cooling screen 139 are supported on the shelf 40 which is hinged to legs 144, the upper ends of which are connected to shelf 145, which supports the refrigerator unit 39.

Adjacent one side of the refrigerator unit 39 and extending forwardly therefrom is a delivery snorkel 42. This snorkel 42 is made of like insulated material and has refrigerant coils 146 passing therethrough. These coils 146 are connected to and are a part of the refrigerant coils 138 as are found in the refrigerator unit 39. The refrigerant coils 146 pass through the length of the snorkel 42 to insure refrigeration of the ingredients remaining in the delivery tubes 147 which are contained in the snorkel 42. These delivery tubes 147 pass from the snorkel 42 into the refrigerator unit 39 through a suitable opening 148 and become a part of the conduit 137 passing from the bottles 136.

Figure 19:
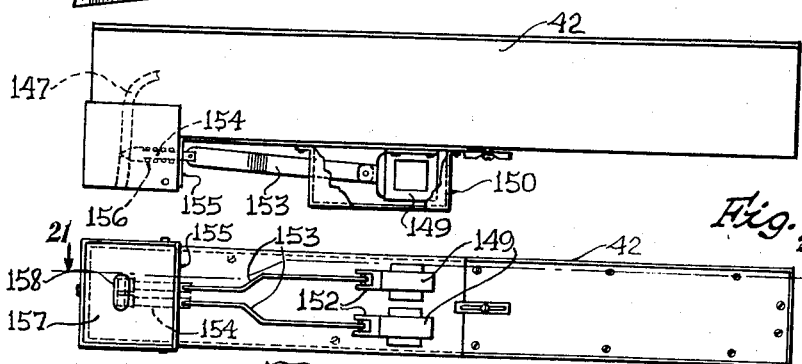
Fig. 19 is a side elevational view of the delivery snorkel unit as associated with my refrigerator unit.
Figure 20:
Fig. 20 is a bottom plan view of the same.
Figure 21:
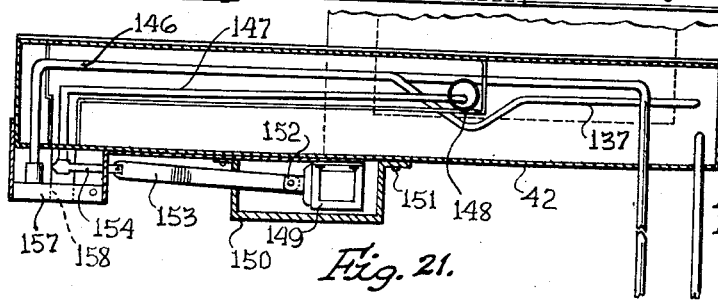
Fig. 21 is a detailed sectional view taken on line 21—21 of Fig. 20.

Figs. 19, 20 and 21 show the delivery snorkel 42. For controlling the delivery of ingredients through the snorkel 42, I position two electromagnetic solenoids 149, on the bottom thereof. These solenoids 149 are enclosed in a suitable housing 150 which is mounted to the bottom of the snorkel 42 by means of screws 151.

The movable plungers 152 of the solenoids 149 have connected thereto extensions 153. Attached to the ends of the extensions 153 are blocking members 154. These members 154 are slidable through suitable openings formed in a rear plate 155 and the snorkel unit 42. The heads of the members 154 are adapted to project beneath the ends of the tubes 147 so as to seal the same when the ingredients therein are not to be delivered therefrom. Between the plate 155 and the heads of the members 154, are springs 156 normally urging the heads into sealing position (Fig. 19).

The delivery snorkel 42 is provided with a frost plate 157 which is provided with an opening 158 above which sits the sealed ends of the delivery tubes 147 (see Fig. 20). This frost plate 157 maintains the temperature at the ends of the tubes to resist spoiling of the ingredients therein.

In my coffee vending machine, I employ a standard cup drop mechanism 51. The operation of such mechanism is well-known in the art and makes up no part of my present invention. However the means as employed herein for positioning the cup after it has been dispensed by the cup drop mechanism 51, is new and novel.

Figure 22:
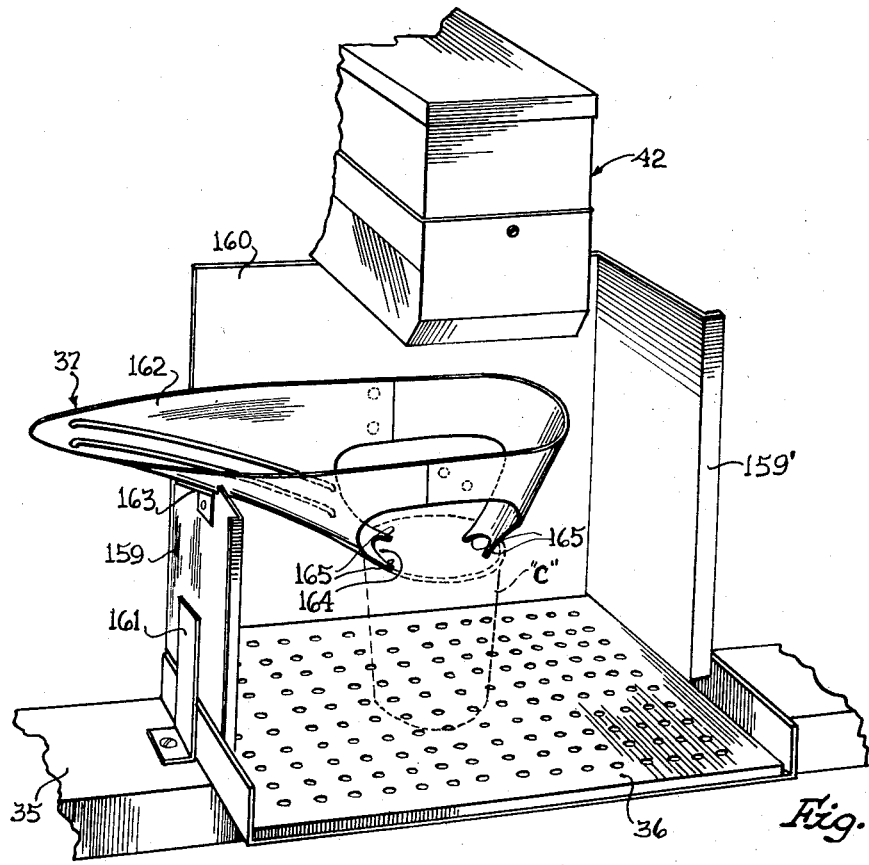
Fig. 22 is a fragmentary perspective view of the cup supporting mechanism as employed in my machine.

Referring to Fig. 22, I show a drain plate 36 supported on the shelf 35. Extending upwardly from the drain plate 36 are side walls 159 and 159' and a rear wall 160 which defines the beverage delivering area. The sidewalls 159 and 159' are mounted on the shelf 35 by brackets 161. The side wall 159 provides a cut-out upon which sits a cup slide 162. This slide 162 is mounted by a bracket 163 to such side wall 159.

The cup slide 162 provides a bottom opening 164 through which a cup C falls. About the peripheral edge of the opening 164, there are provided resilient fingers 165 which releasably hold a cup C on the plate 36 while the ingredients are delivered thereto. The delivery end of the snorkel 42 is positioned above and in spaced relation to the slide 162 and a cup C positioned on plate 36, as viewed in Fig. 22.

In my machine, when the level of brewed coffee in the reservoir 44 falls below a predetermined point, the brewing cycle is instituted as follows:

An electric circuit is closed by the liquid level probes 129, to energize the electric motor 49. This motor 49, through the gears 86 and 87 engaging gear 83, causes rotation of the metering disc 81. The rotation of the disc 81 will cause the cam 170, formed on the outer peripheral edge of such disc, to disengage itself from a movable switch leaf 171 of a switch 172, thus permitting the switch 172 to close and to energize a holding circuit for the motor 49 (Fig. 14).

The disc 81 will rotate a full 360 degrees until the cam 170 again engages the switch leaf 171 to open the switch 172 to deenergize the holding circuit to the electric motor 49. With the rotation of the disc 81, the openings 82 formed therein will be brought into alignment with the opening 73 of the stationary disc 67 and thereby permit powdered coffee to pass from the hopper 47 through the opening 73 into the openings 82. By continuous rotation of the disc 81, the openings 82 formed therein will be brought into registration with the opening 104 of the metering plate 70. In as much as each opening 82 in the disc 81 carries a measured amount of coffee, when such openings 82 are in registration with the opening 104 of the plate 70, such measured amount of powdered coffee will be dispensed into the brewing basket 125.

Rotation of the disc 81 through its cycle will bring the cam 173 into engagement with a movable switch leaf 174 which in turn will close switch 175, energizing an electric program motor (not shown) located in the control panel 54. The switches 172 and 175 are carried by a bracket 176 mounted on one edge of the plate 70 (Fig. 14).

The energization of the aforesaid electric program motor will in turn rotate a series of cams (not shown) which will close other electric switches and energize certain solenoids in a determined sequential order. Such program motor will be energized through a prescribed brewing cycle hereinafter described.

After the disc 81 has rotated as hereinbefore described, and dispensed powdered coffee into the brewing chamber 105, the solenoid valve 118 will be energized to permit hot water to enter the brewing chamber 105. After a predetermined period of time, the hot water solenoid will be deenergized and the coffee will be permitted to brew within the chamber 105.

The solenoid valve 121' will be energized and will open the decant valve 120, thus permitting the brewed coffee to pass through the conduit 128 and into the coffee reservoir 44.

The solenoid valves 116 and 177 will be energized to permit cold water to enter into the brewing chamber 105 to start the rinse cycle. The method of such entry and the operation of the rinse will be hereinafter described. When the solenoid valve 177 is energized, cold water will pass through conduit 103 and enter into bushing 102 of the plate 70 and hence through passage 101 and out the spray head 99. At the same time, when the solenoid valve 116 is energized, water will pass through conduit 115 from the valve 177 to unseat the drain valve 111 in a manner hereinafter described. The cold water rinse continues for a predetermined time after the dispensing of brewed coffee from the brewing chamber 105 is accomplished.

The electric motor 49 is deenergized when the switch 172 is opened by the cam 170, and the brewing cycle is terminated.

To brew coffee and to permit a rinse of the brewing chamber 105, it becomes necessary that I maintain a substantially constant pressure in the water conduits of my machine. The pressure pump 21 is operated by the electric motor 22. This motor 22 is energized in response to the pressure-sensitive switch unit 24. The check valve 23 prevents the pressure from backing off into the water supply tank 20 and the pressure gauge 25 readily indicates the amount of pressure in the water conduits of my machine.

In Figs. 15 and 16, I have shown in detail the construction of the drain valve as associated with the brewing chamber 105. The valve is contained in a casting 178. This casting 178 is connected to the plate 108 by means of screws (not shown) passing through apertures 179 formed in the top flange of the casting 178.

The casting 178 consists of two chambers 180 and 181 connected together by a reduced passage 182 (Fig. 15). Chamber 180 is closed by a suitable screw cap 183 threaded into casting 178. The chamber 180 houses an enlarged base 184 of a stem 185 of the valve unit which terminates into the valve head 111, situated in the brewing chamber 105. A coil spring 186 embraces the stem 185 between the base 184 and the reduced passage 182.

The chamber 180 has open communication with hot and cold water orifices 187 and 188 respectively. The cold water orifice 188 is in communication with the chamber 180 below the base 184. The hot water orifice 187 is in communication with the chamber 180 above the base 184. The position of these orifices 187 and 188 has an operational function which will be hereinafter made apparent. The base 184 is provided with a bleeder slot 189 formed therein and through which cold water is adapted to pass. The stem 185 has a passage 190 formed throughout its length through which both hot and cold water may pass as hereinafter explained.

In chamber 181, a valve head 191 is threaded on the stem 185. This head 191 seals off the passage 182 and chamber 180 from the chamber 181. A pin 192 is carried by the casting 178 and rides in a slot 193 formed in the side of the head 191 to prevent such head 191 from rotating as water passes therearound in a manner hereinafter explained.

Threaded into the head 191 is the end 194 of the stem 195 of the valve head 111. The valve 111 is also formed with a center passage 196 in communication with the passage 190 formed in the stem 185. This passage 196 terminates into exit openings 197 formed in the upper portion of the valve 111. (Figs. 7 and 15.)

It should be noted that chamber 181 has open communication with the drain 112 so that when the valve 111 becomes unseated with respect to the opening 110, any liquid in the brewing chamber 105 will be drained therethrough.

Referring to Fig. 16, I have shown solenoid-operated valve unit 118. This valve unit 118 comprises a valve head 199 and a valve stem 200. The valve stem 200 is contained in a sleee 201 positioned in the center of the electromagnetic coil 202. The sleeve 201 also houses a metallic base 203 which passes through one arm 204 of a U-shaped bracket 205 and which is connected thereto by a nut 206. The other arm 207 of the bracket 205 is welded to a cap 208 which is threaded into a portion of the casting 178. The cap 208 provides a chamber 209 which houses a conical coil-shaped spring 210. The spring 210 is disposed between the valve head 199 and the base of the chamber 209. The casting 178 adjacent the portion into which is threaded the cap 208, provides a chamber 211 which has communication through a reduced orifice 212 with the hot water lead 117. The chamber 211 provides a passage 213 which has communication with the passage 187 and the chamber 180 hereinbefore described. A needle valve 214 is provided in this passage 213 as shown in Fig. 16. The above-described solenoid valve is the hot water valve 118, as shown in Fig. 7. Upon energization of the coil 202 of the solenoid valve 118, the valve stem 200 and the valve head 199 are moved inwardly of the coil 202 against the action of the spring 210 and thereby opening communication through the chamber 211 with passage 213 and the orifice 212, permitting hot water to pass into the chamber 181. The water will pass into the chamber 211 and will, through orifice 212 enter passage 213. From 213 the water will pass valve 214 and enter passage 187 and hence enter into chamber 180. By reason of the pressure in the conduit 117, the water will pass through such chamber 180 and passage 190 of the stem 185 of the valve 111, and out the openings formed therein and into the brewing chamber 105.

The operation of the cold water solenoid valve 116 is identical to that above described. However, the unseating of the valve head 215 of the cold water solenoid valve 116 will open communication between the cold water orifice 216 and the orifice 188 formed in the casting 178, whereby water will be permitted to enter chamber 180 beneath the enlarged base 184 of the stem 185 and will create sufficient pressure thereupon to raise the valve head 111 off and out of an opening 110, establishing open communication between the brewing chamber 105 and the drain 112. It must be remembered however that each of these valves 116 and 118 is operated in a predetermined sequential order so as to perform its specific function at the proper time.

As before mentioned, the desired result of brewing coffee and thereafter rinsing the brewing chamber 105 results from maintaining water pressure in the conduits throughout my machine. In this regard, it is noted that such water pressure is increased by reason of the reduced sizes of the orifices hereinbefore mentioned.

The brewed coffee in the coffee reservoir 44 is maintained in a heated condition by the heating unit 130 associated therewith. The delivery of a measured amount of coffee from such reservoir 44 is regulated by the electromagnetic solenoid valve 57. This valve 57, as well as the solenoids 149 of the delivery snorkel unit 42, are operated by the closing of switches (not shown) through energization of the cup drop mechanism motor 53 and the preset position of the selector 15.

For selecting the beverage to be dispensed by my apparatus, in the present instance, coffee, or coffee with cream, or coffee with sugar, or coffee with cream and sugar, or hot chocolate or the like, I have provided a dial-type selector 15.

This selector includes a circular body 217 having an arrow type pointer 218. The body 217 is mounted over an opening 219 formed in the door panel 11. The body 217 has a fixed shaft 220 extending rearwardly therefrom. This shaft 220 is rotatably journalled through a support block 221 by means of a nut and washer arrangement 222 threaded on the end of the shaft 220. Pressfitted into a slot 223 on the end of the shaft 220 is a rod 224. This rod 224 is connected to and actuates a rotary switch unit 225. The support block 226 is mounted in the opening 219 by means of screws 227. This block 221 provides recesses 228 which house springs 229 which in turn, by reason of their expansion, press upon ball bearings 230 which are adapted to be seated in detents 231 formed in the body 217, there being detents 231 for each position of the selector 15. Under such an arrangement, the arrow-type pointer 218 may be rotated with respect to the block 221 to any selected position as shown in Fig. 2, and will be releasably held there by the spring-urged ball detent arrangement.

In the event that the selector 15 has its pointer 218 positioned on a selection indicating the desired delivery of hot chocolate, the rotary switch unit 225 will cooperate with certain means (not shown or described) on the motor 53 and will energize a solenoid valve 232 (Fig. 4). This solenoid valve 232 is located in a conduit 233 leading out of the refrigerator unit 39, which conduit 233 would have open communication with that one of the bottles 136 containing chocolate syrup. The energization of the solenoid valve 232 would permit a certain amount of chocolate syrup to pass through conduit 233 to a mixing valve 234. This mixing valve 234 is in communication with both the chocolate syrup conduit 233 and a hot water conduit 235 which has its opposite end in communication with the hot water reservoir 27'. The mixing valve 234 will mix a predetermined amount of hot water passing through conduit 235 with a predetermined amount of chocolate syrup passing through conduit 233 and will permit the mixed ingredients to pass to delivery spout 236 from whence it would be delivered to a cup support by the cup holding mechanism 37.

In Fig. 4, I have shown an air blower 58 mounted on the inside of the door panel 11. This blower 58 has a flexible conduit 59 which has its lower end in communication with a slot 237 formed in the door panel 11 (Fig. 23). This slot 237 is part of an air passage 238 formed in the door panel 11. This passage 238 terminates into an exhaust port 239 having communication with the commodity delivery area 14 and door 11. The blower 58 is energized at all times and thus creates an air shield closing the opening 14.

The delivery area 14 is divided by side walls 240 extending inwardly from the door panel 11 and which, together with the cup-support drain plate 36, form such delivery area.

A pivotal door 241 has side panels 242 pivotally hinged as at 243 to the side walls 240 (Fig. 23). This door consists of spaced apart plastic rods 241' attached to the side walls 240 along an arcuated line. These plastic rods 241' are adapted to pass over the cup support mechanism 37 when the door is raised to an open position. A convenient handle 244 is provided to facilitate opening the door. Although I have shown and described this specific type door, it is readily apparent that any form, shape or function of door could be employed with my coffee vending apparatus.

Above the commodity delivery area and door 14 and carried by the door panel 11 is a housing 245 which contains a germicide lamp 246. A suitable lens 247 is provided in the bottom of the housing 248 through which the rays of such lamp 246 may pass into the delivery area 14. The lamp 246 together with the air shield will successfully prevent dust, dirt, and insects, or the like from entering the machine through the delivery area 14.

Figure 25:
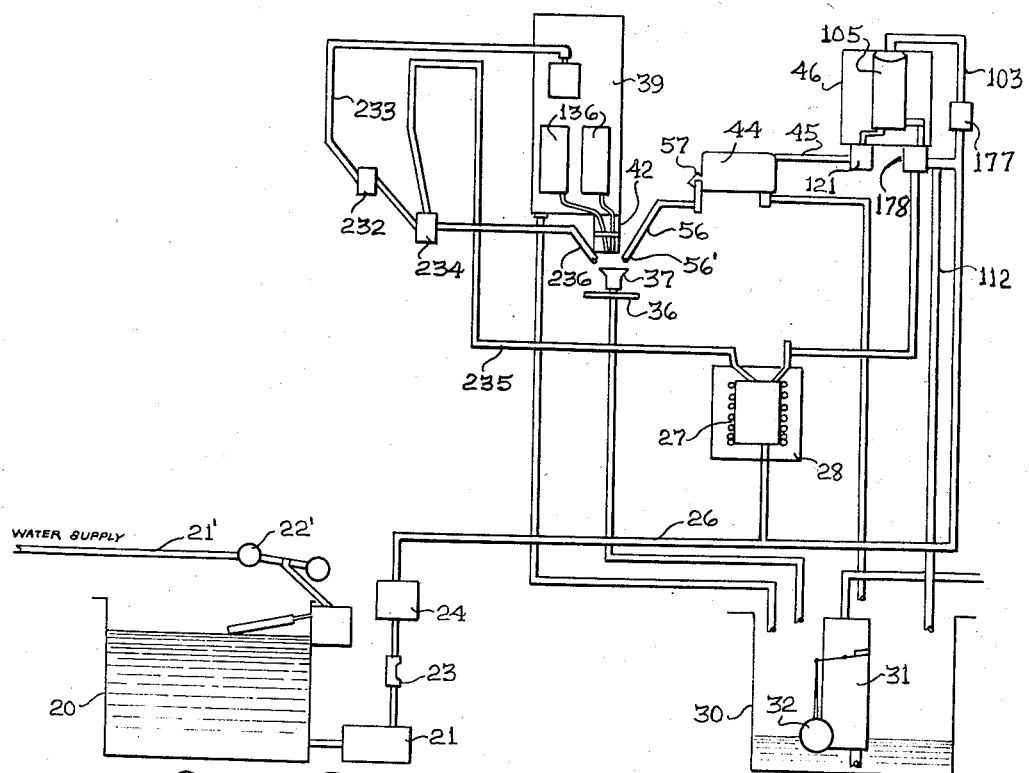
Fig. 25 is a schematic plumbing diagram of the water system as incorporated in my beverage dispensing machine.

In Fig. 25, I have shown a schematic plumbing diagram exemplifying the relation of the heretofore described parts of my coffee vending apparatus. This figure discloses each of the parts heretofore mentioned and are indicated by the reference numerals given to such parts. In such schematic drawing it is clearly shown how the water passes from the water reservoir 20 through the pump 21 to the water heating unit 27 and also to the cold water valves 116 and 177, and the coffee brewing chamber 105. The schematic diagram shows how the heated water passes from the hot water reservoir 27 to the hot water valve 118 and hence to the brewing chamber 105. The hot water system is also shown in its connection with the chocolate syrup mixing valve 234. The schematic diagram shows the coffee reservoir 44, the refrigerator unit 39 and the drainage system 112 having communication with the sump tank 30 as heretofore described.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

I claim:

1. A coffee brewing machine having a cycle of operation including a brewing chamber in which coffee is brewed, a hinged top for said chamber provided with a hot water conduit terminating into a water outlet having communication with said chamber, said top having formed therein adjacent said water outlet a coffee ingredient discharge opening, a removable coffee ingredient hopper carried by said top and having formed in the bottom thereof an opening in vertical alignment with but out of communication with the discharge opening formed in said top, a rotatable metering member disposed between said top of said chamber and said bottom of said hopper and having a plurality of pockets formed therein, means for rotating said member between said top of said chamber and said bottom of said hopper for positioning said pockets in registration with the openings formed therein so as to dispense coffee ingredients from said hopper into said chamber, a coffee ingredient receiving container in said chamber and having open communication with the discharge opening formed in said top of said chamber, means provided by said top for positioning said container in coffee ingredients receiving position within said chamber, means for supplying hot water into said receiving container in said chamber subsequently to the delivery of coffee ingredients thereto, a reservoir having operative communication with said chamber to receive the brewed coffee therefrom, means for delivering brewed coffee from said chamber to said reservoir, means provided by said reservoir for controlling the delivery of coffee ingredients and hot water into said chamber brewing coffee, and means for rinsing said brewing chamber and said receiving container after the delivery of brewed coffee from said chamber to said reservoir.

2. A coffee brewing machine as defined in claim 1 in which said metering member is a disc having gear teeth formed about its periphery with said gear teeth having operable connection to a rotating means.

3. A coffee brewing machine as defined in claim 2 in which said rotating means is an electric device having a chain of gears which have driving connection with the gear teeth of said metering member.

4. A coffee brewing machine as defined in claim 3 in which said rinsing means includes a solenoid operated valve for admitting rinsing liquid into said receiving container and said chamber, said rinsing means having a hydraulically operated drain valve for permitting discharge of said rinsing liquid.

5. A coffee brewing machine having a cycle of operation including a brewing chamber in which coffee is brewed, a hinged top for said chamber provided with a hot water conduit terminating into a water outlet having communication with said chamber, said top having formed therein adjacent said water outlet a coffee ingredient discharge opening, a removable coffee ingredient hopper carried by said top and having formed in the bottom thereof an opening in vertical alignment with but out of communication with the discharge opening formed in said top, a rotatable metering member disposed between said top of said chamber and said bottom of said hopper and having a plurality of pockets formed therein, means for rotating said member between said top of said chamber and said bottom of said hopper for positioning said pockets in registration with the opening formed therein so as to dispense coffee ingredients from said hopper into said chamber, a coffee ingredient receiving container in said chamber and having open communication with the discharge opening formed in said top of said chamber, means provided by said top for positioning said container in coffee ingredients receiving position within said chamber, means for supplying hot water into said receiving container in said chamber subsequently to the delivery of coffee ingredients thereto, a reservoir having operative communication with said chamber to receive the brewed coffee therefrom, means for delivering brewed coffee from said chamber to said reservoir, means provided by said reservoir for controlling the delivery of coffee ingredients and hot water into said chamber brewing coffee, means for rinsing said brewing chamber and said receiving container after the delivery of brewed coffee from said chamber to said reservoir, and means for preventing clogging of the coffee ingredient in the pockets of said metering member as they are rotated into open cmmunication with openings formed in the top of said chamber.

6. A coffee brewing machine as defined in claim 5 in which said metering member is a disc having gear teeth formed about its periphery with said gear teeth having operable connection to a rotating means.

7. A coffee brewing machine as defined in claim 6 in which said rotating means is an electric device having a chain of gears which have driving connection with the gear teeth of said metering member.

8. A coffee brewing machine as defined in claim 7 in which said rinsing means includes a solenoid operated valve for admitting rinsing liquid into said receiving container and said chamber, said rinsing means having a hydraulically operated drain valve for permitting discharge of said rinsing liquid.

References Cited in the file of this patent

UNITED STATES PATENTS

| 2,149,270 | Burgess | Mar. 7, 1939 |
| 2,376,403 | Thompson et al. | May 22, 1945 |
| 2,558,522 | Knapp | June 26, 1951 |
| 2,592,761 | Svendsgaard | Apr. 15, 1952 |
| 2,730,034 | Svendsgaard | Jan. 10, 1956 |
| 2,761,200 | Arnett | Sept. 4, 1956 |
| 2,827,845 | Richeson | Mar. 25, 1958 |